(12) United States Patent
Osogami

(10) Patent No.: US 10,909,451 B2
(45) Date of Patent: *Feb. 2, 2021

(54) APPARATUS AND METHOD FOR LEARNING A MODEL CORRESPONDING TO TIME-SERIES INPUT DATA

(71) Applicant: INTERNATIONAL BUSINESS MACHINES CORPORATION, Armonk, NY (US)

(72) Inventor: Takayuki Osogami, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1084 days.

This patent is subject to a terminal disclaimer.

(21) Appl. No.: 15/254,378

(22) Filed: Sep. 1, 2016

(65) Prior Publication Data

US 2018/0060729 A1    Mar. 1, 2018

(51) Int. Cl.
*G06N 3/08* (2006.01)
*G06N 3/04* (2006.01)

(52) U.S. Cl.
CPC ............. *G06N 3/08* (2013.01); *G06N 3/0445* (2013.01)

(58) Field of Classification Search
CPC ............................... G06N 3/0472; G06N 3/08
See application file for complete search history.

(56) References Cited

U.S. PATENT DOCUMENTS

2014/0180986 A1    6/2014 Hinton et al.

FOREIGN PATENT DOCUMENTS

CN    104809502 A    7/2015
CN    104915654 A    9/2015

OTHER PUBLICATIONS

Taylor, Graham W. and Geoffrey E. Hinton. "Factored Conditional Restricted Boltzmann Machines for Modeling Motion style" 2009 [Online] Downloaded Dec. 10, 2019 https://dl.acm.org/citation.cfm?id=1553505 (Year: 2009) (Year: 2009).*
Marlin, Benjamin M. et al . "Inductive Principles for Restricted Boltzmann Machine Learning" 2010 [Online] Downloaded Apr. 30, 2020 http://proceedings.mir.press/v9/marlin10a/marlin10a.pdf (Year: 2010).*

* cited by examiner

*Primary Examiner* — Ben M Rifkin
(74) *Attorney, Agent, or Firm* — Tutunjian & Bitetto, P.C.; Randall Bluestone

(57) ABSTRACT

A learning apparatus and method for learning a model corresponding to time-series input data, comprising: acquire the time-series input data; supply a plurality of input nodes of the model with a plurality of input values corresponding to input data at one time point in the time-series input data; store values of hidden nodes; compute a conditional probability of each input value at the one time point on a condition that an input data sequence has occurred, based on the input data sequence before the one time point in the time-series input data, on the stored values of hidden nodes, and on weight parameters; and perform a learning process that further increases a conditional probability of input data occurring at the one time point on the condition that the input data sequence has occurred, by adjusting the weight parameters.

19 Claims, 9 Drawing Sheets

APPARATUS AND METHOD FOR LEARNING A MODEL CORRESPONDING TO TIME-SERIES INPUT DATA

BACKGROUND

Technical Field

The present invention relates to a learning apparatus and a method for learning a model corresponding to time-series input data.

Related Art

It has been known that machine learning using Boltzmann machines can achieve high performance in classification of still images or the like. Such Boltzmann machines applied to time-series data, namely, dynamic Boltzmann machines, have been proposed.

Improvements in the expressive ability, learning ability, and the like of Boltzmann machines that consider such time evolution are desired in order for these Boltzmann machines to be applied to various fields such as moving images, languages, and music.

SUMMARY

According to a first aspect of the present invention, provided is a learning apparatus for learning a model corresponding to time-series input data, comprising a processor and one or more computer readable mediums collectively including instructions that, when executed by the processor, cause the processor to: acquire the time-series input data; supply a plurality of input nodes of the model with a plurality of input values corresponding to input data at one time point in the time-series input data; store values of hidden nodes; compute a conditional probability of each input value at the one time point on a condition that an input data sequence has occurred, based on the input data sequence before the one time point in the time-series input data, on the stored values of hidden nodes, and on weight parameters between (i) a plurality of hidden nodes and a plurality of input values corresponding to input data at each time point before the one time point in the input data sequence and (ii) the plurality of input nodes and corresponding hidden nodes at the one time point; and perform a learning process that further increases a conditional probability of input data occurring at the one time point on the condition that the input data sequence has occurred, by adjusting the weight parameters.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
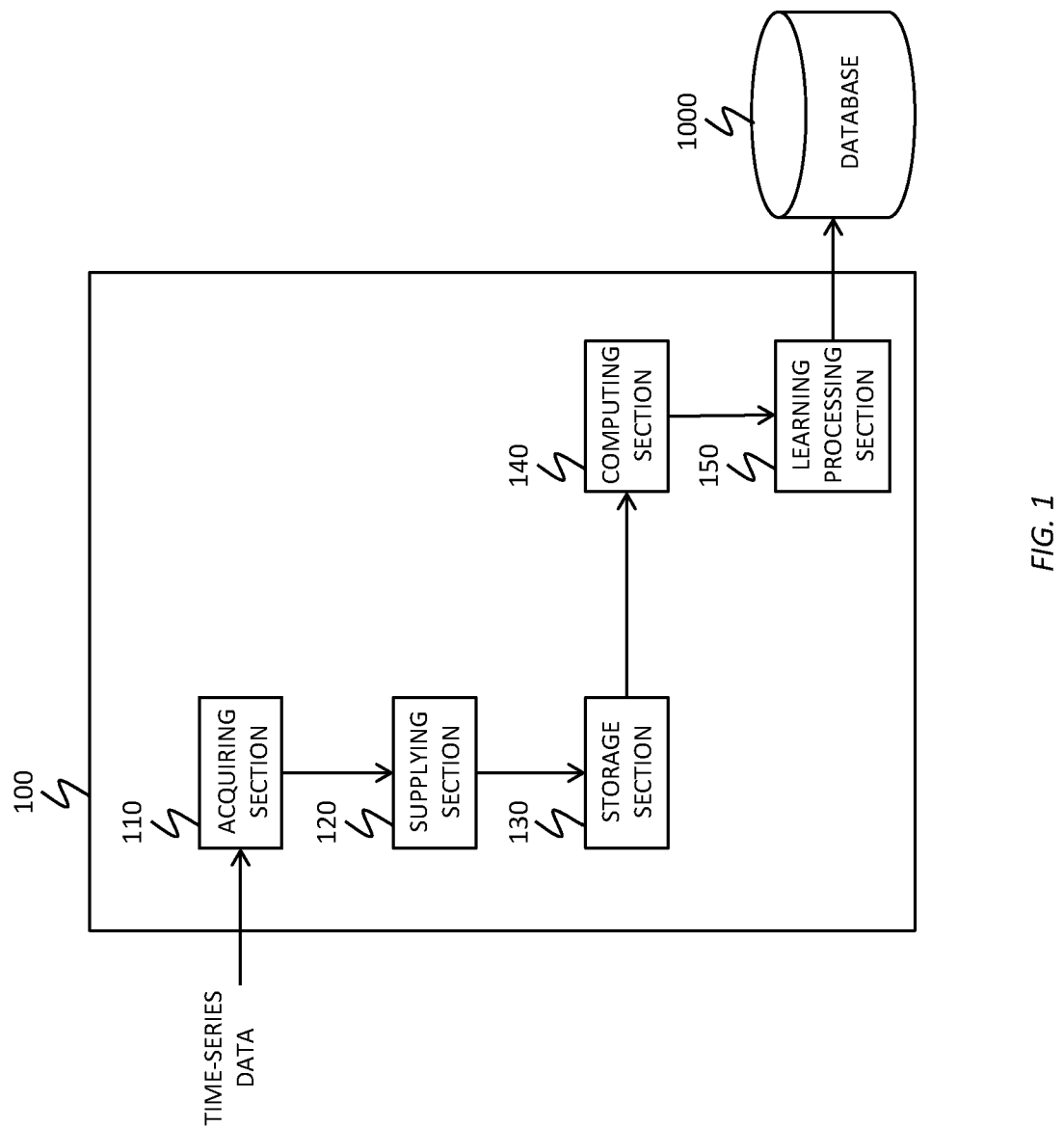
FIG. 1 shows an exemplary configuration of a learning apparatus 100 according to an embodiment.

FIG. 1 shows an exemplary configuration of a learning apparatus 100 according to an embodiment. The learning apparatus 100 may be an apparatus for learning a model corresponding to time-series input data. The learning apparatus 100 may be operable to learn a model based on a Boltzmann machine by supplying time-series data to nodes of the model. The learning apparatus 100 includes an acquiring section 110, a supplying section 120, a storage section 130, a computing section 140, and a learning processing section 150.

The acquiring section 110 may be operable to acquire time-series input data. Time-series input data may be, for example, a data sequence in which a plurality of pieces of data are arranged along a time axis, such as moving image data. The acquiring section 110 may be connected to a device operated by a user or a device (sensor) that detects and outputs time-series data and may acquire the time-series input data from such a device. Alternatively, the acquiring section 110 may read and acquire time-series input data stored in a storage device in a predetermined format. Alternatively, the acquiring section 110 may be connected to a network and acquire time-series input data via the network. The acquiring section 110 may also store the acquired time-series input data in a storage device included in the learning apparatus 100.

The supplying section 120 may be operable to supply a plurality of input values corresponding to input data at one time point in the time-series input data to a plurality of nodes of a model. The supplying section 120 is connected to the acquiring section 110 and may handle, as training data, input data at one time point in the received time-series input data and supply input values at the one time point to corresponding nodes of the model. Input data at one time point may be the temporally newest data in a training data set for use in learning. Alternatively, input data at one time point may be temporally intermediate data in a training data set for use in learning. That is, input data at one time point may be selected arbitrarily from the time-series data.

The storage section 130 may be operable to store values of hidden nodes of the model in correspondence with a plurality of time points in the time-series input data. The storage section 130 may sample the values of hidden nodes corresponding to one time point and store these values in the hidden nodes corresponding to this time point. The storage section 130 may store the sampled values respectively in the hidden nodes corresponding to the time points for each time point.

The computing section 140 may be operational to compute a conditional probability of each input value at one time point on a condition that an input data sequence has occurred. Here, in the time-series input data, the pieces of data input to the respective nodes of the model at one time point are referred to as input values at one time point, and the pieces of data input to the respective nodes at the time points before the one time point are referred to as the input data sequence. A model used by the learning apparatus 100 may have a weight parameter between (i) a plurality of hidden nodes and a plurality of input values corresponding to input data at each time point prior to the one time point in an input data sequence and (ii) a plurality of hidden nodes corresponding to the one time point and a plurality of input nodes.

The computing section 140 may be operable to compute a conditional probability of each input value at one time point, on the basis of an input data sequence before the one time point in the time-series input data, the stored values of hidden nodes, and the weight parameter of the model. Furthermore, the computing section 140 may be operable to compute a conditional probability of the value of each hidden node at one time point on a condition that an input data sequences has occurred, based on an input data sequence before the one time point in the time-series input data and the weight parameter of the model.

The learning processing section 150 may be operable to increase a conditional probability of input data at one time point occurring on a condition that the input data sequence has occurred, by adjusting the weight parameter of the model. The learning processing section 150 may further adjust bias parameters which are given respectively to the plurality of nodes and hidden nodes of the model. The learning processing section 150 may supply the adjusted weight parameter and bias parameters of the model to a storage device, such as an external database 1000, to store these parameters in the storage device.

The above-described learning apparatus 100 according to the present embodiment may be operable to learn the model by adjusting the weight parameter and bias parameters of the model, based on input data at one time point in the time-series input data. The model according to the present embodiment is described with reference to FIG. 2.

Figure 2:
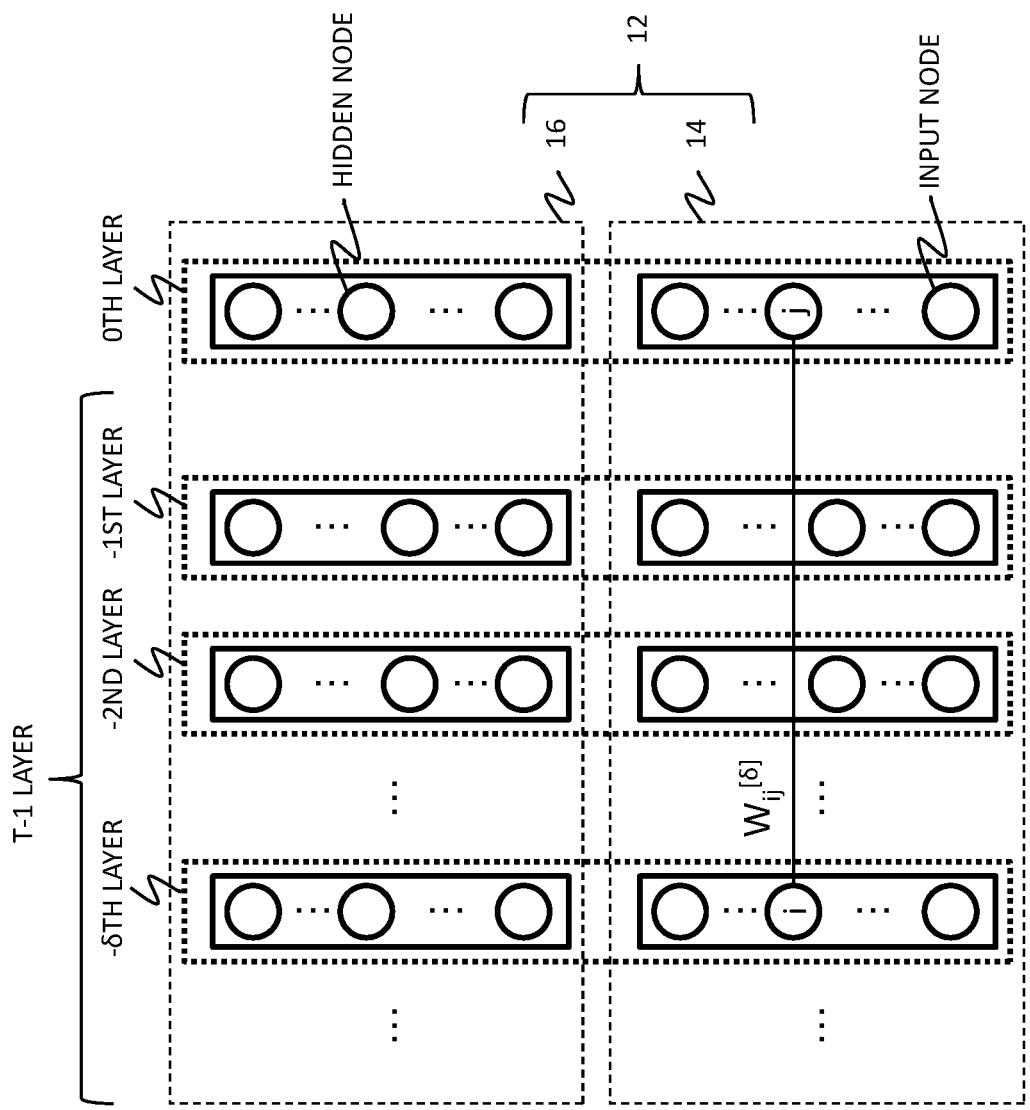
FIG. 2 shows an exemplary configuration of a model 10 according to the present embodiment.

FIG. 2 shows an exemplary configuration of a model 10 according to the present embodiment. The model 10 includes a plurality of common layers 12. FIG. 2 shows an example including a total of T common layers 12. The model 10 may include a finite number of common layers 12. Each common layer 12 includes an input layer 14 and a hidden layer 16.

Each input layer 14 may be a layer corresponding to the time-series data. Each input layer 14 may correspond to a respective time point in the time-series data. Each input layer 14 may include a predetermined number of nodes. For example, the 0-th input layer may be a layer corresponding to input data at one time point in the time-series data. The 0-th input layer may include a plurality of nodes corresponding to the number of input values in this input data.

A total of T−1 input layers 14 other than the 0-th input layer 14 among the plurality of input layers may be input layers 14 corresponding to the input data sequence before the one time point in the time-series input data. For example, the −1st input layer may correspond to input data at a time point that temporally precedes the one time point by one time point, and the (−δ)-th input layer may correspond to input data at a time point that temporally precedes the one time point by δ time points. That is, a total of T−1 input layers other than the 0-th input layer each have the same number of nodes as the 0-th input layer and are respectively supplied with input values of corresponding input data values in the input data sequence, for example.

Each hidden layer 16 may correspond to a respective time point in the time-series data. For example, the 0-th hidden layer may be a layer corresponding to one time point in the time-series data. FIG. 2 shows an example including a total of T hidden layers 16. Each hidden layer 16 may include one or more hidden nodes, and the storage section 130 may store the values sampled at the one time point.

A total of T−1 hidden layers other than the 0-th hidden layer among the plurality of hidden layers 16 may be hidden layers 16 corresponding to time points before the one time point in the time-series data. For example, the −1st hidden layer corresponds to a time point that temporally precedes the input data of the one time point by one time point, and the storage section 130 stores the values sampled at the time point that temporally precedes the one time point by one time point. Furthermore, the (−δ)-th hidden layer may correspond to a time point that temporally precedes the input data of the one time point by δ time points, and the storage section 130 may store the values sampled at the time point that temporally precedes the one time point by δ time points. That is, a total of T−1 hidden layers other than the 0-th hidden layer each have the same number of nodes as the 0-th hidden layer and are respectively supplied with values of corresponding hidden nodes, for example.

As an example, in the case where the time-series input data is moving image data, the last image data of the moving image data corresponds to the 0-th input layer, and a plurality of nodes of the 0-th input layer each receive corresponding pixel data of the image data. Furthermore, the 0-th hidden layer corresponds to the final time point of the moving image data, and the storage section 130 may store values sampled at this final time point in the hidden nodes of the 0-th hidden layer.

In addition, the −1st input layer is supplied with image data that immediately precedes the last image data, and a plurality of nodes of the −1st input layer each receive corresponding pixel data of the immediately preceding image data. Furthermore, the −1st hidden layer corresponds to the time point that immediately precedes the final time point, and for each of the plurality of nodes of the −1st hidden layer, the storage section 130 may store the values sampled at this immediately preceding time point. Similarly, the plurality of nodes of the (−δ)-th input layer each receive corresponding pixel data of image data that precedes the last image data by δ images, and the plurality of nodes of the (−δ)-th hidden layer each store corresponding sampling values at the time point that precedes the last time point by δ time points.

FIG. 2 shows an example in which each common layer 12 includes an input layer 14 and a hidden layer 16, but instead, one or more common layers 12 need not include a hidden layer 16. In such a case, the 0-th common layer to the (−m)-th common layer include input layers 14 and hidden layers 16, and the (−m−1)-th common layer to (−T+1)-th common layer may include input layers 14.

The plurality of nodes in the 0-th input layer and/or the plurality of hidden nodes in the 0-th hidden layer may each have a bias parameter. For example, the j-th node j in the common layer 12 has a bias parameter $b_j$.

The plurality of nodes in the 0-th input layer and the nodes of the hidden layer corresponding to the input data sequence and layers corresponding to the input data sequence before the one time point may respectively have weight parameters therebetween. There need not be weight parameters between the plurality of nodes in each input layer 14 and hidden layer 16.

Similarly, the plurality of nodes in the 0-th hidden layer and the nodes of the hidden layer corresponding to the input data sequence and layers corresponding to the input data sequence before the one time point may respectively have weight parameters therebetween. That is, the plurality of nodes of the 0-th common layer and the nodes of the plurality of common layers before the one time point may respectively have weight parameters therebetween.

FIG. 2 shows a concept of a weight parameter $W_{ij}^{[\delta]}$ between the node j of the 0-th input layer and a node i of the (−δ)-th layer. FIG. 2 shows an example in which the model 10 has the same number of input layers 14 and layers 16, each input layer 14 includes I nodes, and each hidden layer 16 includes H hidden nodes. In the present embodiment, the input layers 14 and hidden layers 16 are expressed by one common layer 12 that has a plurality of nodes $x_j^{[t]}$. The first to I-th nodes (1≤j≤I) of the common layer 12 indicate the nodes of the input layer 14, and the (I+1)-th to (I+H)-th nodes (I+1, j, I+H) indicate hidden nodes.

For example, the weight parameter $W_{ij}^{[\delta]}$ shown in FIG. 2 indicates a weight parameter between two nodes of an input layer 14. Similarly, the weight parameter $W_{ij}^{[\delta]}$ may include weight parameters from an input node to a hidden node, from a hidden node to an input node, and between to hidden nodes. A specific example of a weight parameter $W_{ij}^{[\delta]}$ is as shown in the Expression below. In the present embodiment, a weight parameter from an input node or hidden node to an input node is referred to as a "weight parameter to an input node," and a weight parameter from an input node or hidden node to a hidden node is referred to as a 'weight parameter to a hidden node."

$$W_{ij}^{[\delta]} = \hat{W}_{ij}^{[\delta]} + \hat{W}_{ij}^{[-\delta]}$$ Expression 1

$$\hat{W}_{ij}^{[\delta]} = \begin{cases} 0 & \text{if } \delta = 0 \\ \sum_{k \in K} u_{i,j,k} \lambda_k^{\delta - d_{ij}} & \text{if } \delta \geq d_{ij} \\ \sum_{l \in L} -v_{i,j,l} \mu_k^{-\delta} & \text{otherwise} \end{cases}$$

Here, $u_{i,j,k}$ and $v_{i,j,l}$ are learning parameters that are learning targets, for example. Furthermore, $\lambda_k^{t1}$ and $\mu_l^{t2}$ are predefined parameters that change in a predetermined manner in accordance with a time point difference δ between the hidden nodes and input data in the input data sequence before the one time point and the hidden nodes and input data at the one time point (t1=δ−$d_{ij}$, t2=−δ). That is, the weight parameter $W_{ij}^{[ij]}$ may be a parameter based on the learning parameters $u_{i,j,k}$ and $v_{i,j,l}$ and the predefined parameters $\lambda_k^{t1}$ and $\mu_l^{t2}$.

The weight parameter $W_{ij}^{[\delta]}$ may be a parameter based on a positive value, which is based on a product of the first learning parameter $u_{i,j,k}$ and the first predefined parameter $\lambda_k^{t1}$, and a negative value, which is based on a product of the second learning parameter $v_{i,j,l}$ and a second predefined parameter $\mu_l^{t2}$. Specifically, in the case where the time point difference δ is greater than or equal to a predetermined delay constant $d_{ij}$, the weight parameter $W_{ij}^{[\delta]}$ may be a positive value based on a product of the first learning parameter $u_{i,j,k}$ and the first predefined parameter $\lambda_k^{t1}$. In the case where the time point difference δ is less than the delay constant $d_{ij}$ and is not equal to 0, the weight parameter $W_{ij}^{[\delta]}$ may be a negative value based on a product of the second learning parameter $v_{i,j,l}$ and the second predefined parameter $\mu_l^{t2}$. In addition, in the case where the time point difference δ is equal to 0, the weight parameter $W_{ij}^{[\delta]}$ may be equal to 0.

In addition, in the case where the time point difference δ is greater than or equal to the predetermined delay constant $d_{ij}$, the weight parameter $W_{ij}^{[ij]}$ may be based on a plurality of positive values that are based on the products $u_{i,j,k}$, $\lambda_k^{t1}$ of a plurality of sets of the first learning parameter $u_{i,j,k}$ and the first predefined parameter $\lambda_k^{t1}$ respectively from among the plurality of first learning parameters $u_{i,j,k}$ and the plurality of first predefined parameters $\lambda_k^{t1}$. In addition, in the case where the time point difference δ is less than the predetermined delay constant $d_{ij}$ and is not equal to 0, the weight parameter $W_{ij}^{[\delta]}$ may be based on a plurality of negative values that are based on products $v_{i,j,l}$, $\mu_l^{t2}$ of a plurality of sets of the second learning parameter $v_{i,j,l}$ and the second predefined parameter $\mu_l^{t2}$ respectively from among the plurality of second learning parameters $v_{i,j,l}$ and the plurality of second predefined parameters $\mu_l^{t2}$.

A predefined parameter may be a parameter based on a value obtained by raising a predetermined constant to the power of a value based on the time point difference δ. The first predefined parameter $\lambda_k^{t1}$ is a parameter whose value gradually decreases as the time point difference δ increases, for example. In this case, the first predefined parameter $\lambda_k^{t1}$ may be a value obtained by raising a first constant $\lambda_k$, which is greater than 0 and less than 1, to the power of a value obtained by subtracting the predetermined delay constant $d_{ij}$ from the time point difference δ (δ−$d_{ij}$=t1). In addition, the second predefined parameter $\mu_l^{t2}$ may be a parameter whose value gradually decreases as the time point difference δ increases, for example. In this case, the second predefined parameter $\mu_l^{t2}$ may be a value obtained by raising a second constant $\mu_l$, which is greater than 0 and less than 1, to the power of a negative value of the time point difference δ (−δ=t2).

The above-described model 10 according to the present embodiment may be operable to form a Boltzmann machine. That is, the model 10 may be a Boltzmann machine to which time-series data is applied. The model 10 may be a Boltzmann machine that includes hidden layers into which are input values differing from the time-series data, in addition to the input layers into which the time-series data is input. The learning apparatus 100 according to the embodiment learns the model 10 by adjusting the learning parameters $u_{i,j,k}$ and $v_{i,j,l}$ and the bias parameter $b_j$ while sampling and storing the values of the hidden nodes, by using, as training data, input data at one time point that is supplied to the 0-th input layer of the model 10. A learning operation of the learning apparatus 100 is described with reference to FIG. 3.

Figure 3:
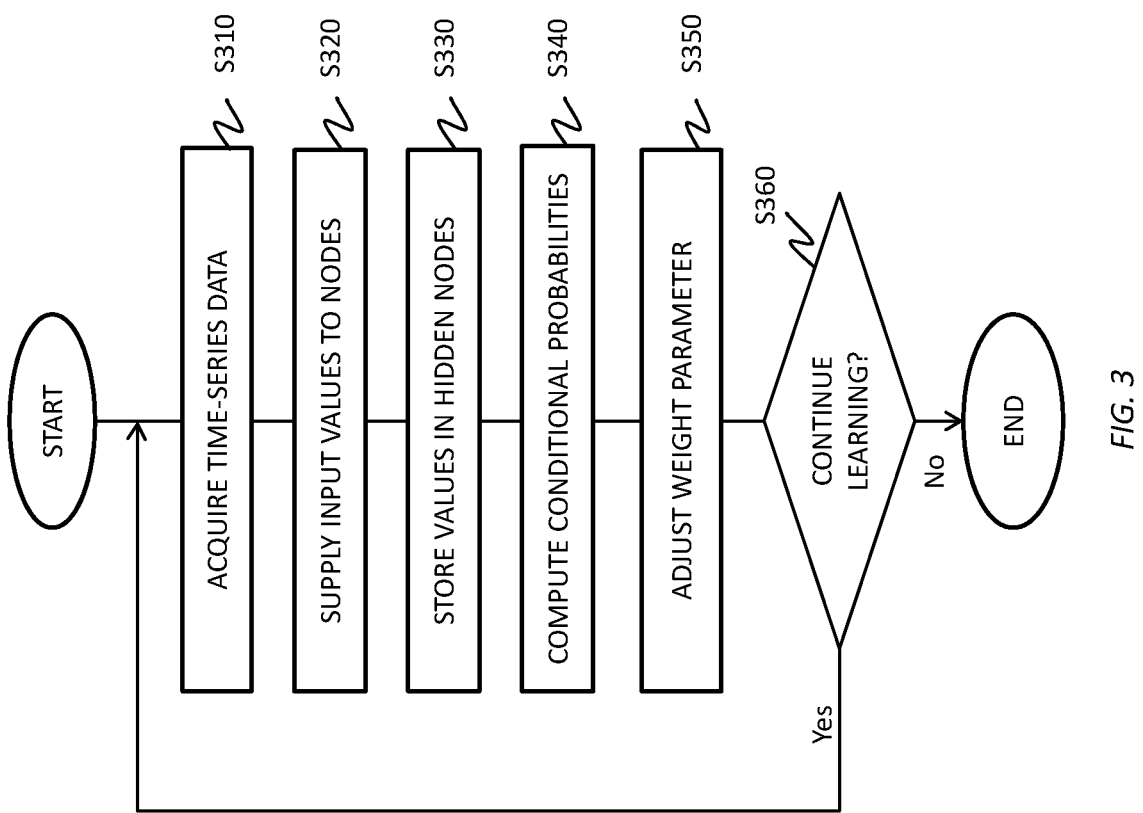
FIG. 3 shows a flow of an operation of the learning apparatus 100 according to the present embodiment.

FIG. 3 shows a flow of an operation of the learning apparatus 100 according to the present embodiment. In the present embodiment, the learning apparatus 100 may be operable to learn the model 10 corresponding to time-series input data and determine the learning parameters $u_{i,j,k}$ and $v_{i,j,l}$ and the bias parameter $b_j$, by executing the processing steps of S310 to S360. In the present embodiment, first, an example is described in which the determination of the weight parameters to the hidden nodes and the weight parameters to the input nodes is performed by the learning apparatus 100 using substantially the same operation.

First, the acquiring section 110 may acquire time-series data (S310). The acquiring section 110 may acquire time-series data of a duration equivalent to a total of T layers from the 0-th layer to the (−T+1)-th layer of the model 10. The acquiring section 110 acquires, for example, T pieces of image data in time-series that form the moving image data.

Then, the supplying section 120 may supply a plurality of input values corresponding to the input data of the time-series input data at one time point to the plurality of input nodes of the 0-th input layer of the model 10 (S320). Here, $x_{[1,I]}^{[0]}$ ($=x_j^{[0]}$, $1 \leq j \leq I$) denotes input data supplied to the 0-th input layer.

The supplying section 120 supplies, for example, I input values $x_j^{[0]}$ corresponding to input data $x_{[1,I]}^{[0]}$ of the time-series input data at the most recent time point to the corresponding nodes j of the 0-th input layer ($1 \leq j \leq I$). For example, the supplying section 120 supplies I pieces of pixel data included in the last piece of image data of T pieces of image data arranged in time series to form the moving image data to I nodes of the 0-th input layer. The supplying section 120 may supply a value of 1 or 0 as the pixel data to each node of the 0-th input layer. If the duration of the time-series input data is shorter than T, the supplying section 120 may supply the data to a number of layers from the 0-th input layer corresponding to the length of the time series, and may supply a value of 0, for example, to the nodes of the rest of the layers.

Then, the supplying section 120 may supply a plurality of input values corresponding to the input data sequence before the one time point to the plurality of nodes included in respective layers from the −1st input layer to the (−T+1)-th input layer of the model 10. Here, let $x_j^{(-T, -1]}$ denote input data supplied to layers from the −1st input layer to the (−T+1)-th input layer ($1 \leq j \leq I$). The term (−T, −1] indicates layers from the (−T+1)-th layer to the −1st layer. That is, the input data $x_j^{(-T, -1]}$ in the time-series data denotes a history up to the input data $x_j^{[0]}$, for example.

Next, the storage section 130 samples the values of a plurality of hidden nodes corresponding to the one time point, and respectively stores these values in the corresponding plurality of hidden nodes of the 0-th hidden layer (S330). The storage section 130 may arbitrarily or randomly input values of 1 or 0. The storage section 130 stores H sampled values in the corresponding hidden nodes j of the 0-th hidden layer, for example ($I+1 \leq j \leq I+H$).

The storage section 130 may store the values of the hidden nodes before the one time point respectively in a plurality of nodes in each of the corresponding hidden layers from the −1st hidden layer to the (−T+1)-th hidden layer of the model 10. Here, let let $x_j^{(-T, -1]}$ denote the values of the hidden nodes stored in the layers from the −1st hidden layer to the (−T+1)-th hidden layer ($I+1 \leq j \leq I+H$). That is, the values $x_j^{(-T, -1]}$ input to the nodes of each common layer 12 before the one time point denote a history up to the input values $x_j^{[0]}$ input to the nodes of the 0-th common layer, for example ($1 \leq j \leq I+H$).

Then, the computing section 140 may compute conditional probabilities of each input value $x_j^{[0]}$ ($1 \leq j \leq I$) of an input node at the one time point, based on the input values $x_j^{(-T, -1]}$ ($1 \leq j \leq I+H$) of the plurality of nodes of the (−T+1)-th common layer to the −1st common layer and the weight parameter $W_{ij}^{[\delta]}$ (S340). The computing section 140 computes a probability $\langle x_j^{[0]} \rangle_\theta$ of the input value $x_j^{[0]}$ ($1 \leq j \leq I$) of the j-th node of the 0-th input layer being equal to 1 by substituting 1 for $x_j^{[0]}$ in the following expression, based on the history $x^{(-T, -1]}$ ($1 \leq j \leq I+H$) of the plurality of nodes of the common layer 12.

$$\langle X_j^{[0]} \rangle_\theta = \qquad \text{Expression 2}$$

$$p_{\theta,j}(x_j^{[0]} \mid x^{(-T,-1]}) = \frac{\exp(-\tau^{-1} E_{\theta,j}(x_j^{[0]} \mid x^{(-T,-1]}))}{1 + \exp(-\tau^{-1} E_{\theta,j}(x_j^{[0]} \mid x^{(-T,-1]}))}$$

In the present embodiment, an example is described in which the input value $x_j^{[0]}$ of each node is binary, i.e. 1 or 0, but the value of the input value $x_j^{[0]}$ is not limited to these values. Furthermore, in the step for computing the conditional probabilities of each input value $x_j^{[0]}$ ($1 \leq j \leq I$) of the 0-th input layer, the computing section 140 may compute the conditional probabilities of the values $x_j^{[0]}$ ($I+1 \leq j \leq I+H$) of the 0-th hidden layer.

Expression 2 is derived as a Boltzmann machine from a known probability formula. For example, θ denotes a set of parameters to be computed, and the formula $\theta=(b_j, u_{i,j,k}, v_{i,j,l})$ is established. In addition, τ may be a parameter that is dependent on a known "system temperature" of the Boltzmann machine, and may be preset by a user or the like. Also, $E_{\theta,j}(x_j^{[0]} x^{-(-T, -1]})$ of Expression 2 is computed by using the following expression.

$$E_{\theta,j}(x_j^{[0]} \mid x^{(-T,-1]}) = -b_j x_j^{[0]} - \sum_{t=-T}^{-1} (x^{[t]}) W_{:,j}^{[-t]} x_j^{[0]} \qquad \text{Expression 3}$$

Here, "T'" denotes a transpose, ":" denotes 1 to n in a case where n (=I+H) denotes the number of nodes, and ":,j" indicates extraction of the j-th column That is, the second term on the right side of Expression 3 is denoted by the following expression, for example.

$$\sum_{t=-T}^{-1} (x^{[t]})^T W_{:,j}^{[-t]} x_j^{[0]} = (x_1^{[t]}, x_2^{[t]}, \ldots, x_n^{[t]}) \begin{pmatrix} W_{1,j}^{[-t]} \\ W_{2,j}^{[-t]} \\ \vdots \\ W_{n,j}^{[-t]} \end{pmatrix} x_j^{[0]} = \qquad \text{Expression 4}$$

$$\sum_{i=1}^{N} \left( \sum_{k \in K} u_{i,j,k} \alpha_{i,j,k} - \sum_{l \in L} v_{i,j,l} \beta_{i,j,l} - \sum_{l \in L} v_{j,i,l} \gamma_{i,l} \right) x_j^{[0]}$$

Here, $\alpha_{i,j,k}$, $\beta_{i,j,l}$, and $\gamma_{i,l}$ are denoted by the following expressions.

$$\alpha_{i,j,k} \equiv \sum_{t=-T}^{-d_{ij}} \lambda_k^{-t-d_{ij}} x_i^{[t]} \qquad \text{Expression 5}$$

$$\beta_{i,j,k} \equiv \sum_{t=-d_{ij}+1}^{-1} \mu_l^t x_i^{[t]} \qquad \text{Expression 6}$$

$$\gamma_{i,l} \equiv \sum_{t=-T}^{-1} \mu_l^{-t} x_i^{[t]} \qquad \text{Expression 7}$$

Accordingly, $P_{\theta,j}(1 \mid x_j^{(-T, -1]})$ obtained by substituting 1 for $x_j^{[0]}$ of Expression 2 can be computed from Expression 3 by substituting 1 for $x_j^{[0]}$ in expression 5. Note that predetermined initial values (for example, 0) may be substituted for the parameter set $\theta=(b_j, u_{i,j,k}, v_{i,j,l})$. In this way, the computing section 140 can compute a conditional probability $<x_j^{[0]}>_\theta$ of each input value $x_j^{[0]}$ at the one time point which is denoted by Expression 2.

Then, the learning processing section 150 may adjust the parameter set $\theta=(b_j, u_{i,j,k}, v_{i,j,l})$ (S350). When adjusting the bias parameter $b_j$, the learning processing section 150 may determine a direction of the change in the bias parameter $b_j$ by using the following expression.

$$\frac{\partial}{\partial b_j}\log P_\theta(x_{[1,l]}^{[0]} | x^{(-T,-1]}) = \tau^{-1}(x_j^{[0]} - \langle X_j^{[0]}\rangle_\theta) \quad \text{Expression 8}$$

Here, $x_j^{[0]}$ on the right side of Expression 8 denotes an input value supplied as training data by the supplying section 120, and $<x_j^{[0]}>_\theta$ on the right side denotes a probability computed by using Expression 2 ($1 \leq j \leq I$). The bias parameter $b_j$ for each input node ($1 \leq j \leq I$) may be adjusted and updated as denoted by the following expression by using Expression 8. Note that a coefficient c is a parameter predetermined by the user or the like.

$$b_j \leftarrow b_j + c\frac{1}{\tau}(x_j^{[0]} - \langle X_j^{[0]}\rangle_\theta) \quad \text{Expression 9}$$

That is, the learning processing section 150 adjusts the bias parameter $b_j$ so as to increase the conditional probability of the input value $x_j^{[0]}$ of the node of the 0-th input layer occurring, on a condition that the history $x^{(-T,-1]}$ of the common layer 12 has occurred. The learning processing section 150 may iteratively perform updating of the bias parameter $b_j$ denoted by Expression 9 and computing of the probability $<x_j^{[0]}>_\theta$ denoted by Expression 2, to determine the bias parameter $b_j$. The learning processing section 150 stops updating the bias parameter $b_j$ and determines the bias parameter $b_j$ if a difference in the bias parameter $b_j$ before and after updating is less than or equal to a predetermined threshold. If a bias parameter $b_j$ is also set for a hidden node, the learning processing section 150 may determine the bias parameter $b_j$ of the hidden node in the same manner.

Alternatively, the learning processing section 150 may decide upon the bias parameter $b_j$ by iteratively updating the bias parameter $b_j$ a predetermined number of times. If a difference in the bias parameter $b_j$ before and after updating is greater than or equal to the predetermined threshold even after the bias parameter $b_j$ has been updated the predetermined number of times, the learning processing section 150 may stop updating the bias parameter $b_j$ and inform the user that the parameter does not converge.

Similarly, when updating the learning parameter $u_{i,j,k}$, the learning processing section 150 may determine the direction of a change in the learning parameter $u_{i,j,k}$ by using the following expression.

$$\frac{\partial}{\partial u_{i,j,k}}\log P_\theta(x_{[1,l]}^{[0]} | x^{(-T,-1]}) = \tau^{-1}\alpha_{i,j,k}(x_j^{[0]} - \langle X_j^{[0]}\rangle_\theta) \quad \text{Expression 10}$$

In addition, when updating the learning parameter $v_{i,j,l}$, the learning processing section 150 may determine the direction of a change in the learning parameter $v_{i,j,l}$ by using the following expression.

$$\frac{\partial}{\partial v_{i,j,l}}\log P_\theta(x_{[1,l]}^{[0]} | x^{(-T,-1]}) = \quad \text{Expression 11}$$
$$-\tau^{-1}\beta_{i,j,l}(x_j^{[0]} - \langle X_j^{[0]}\rangle_\theta) - \tau^{-1}\gamma_{j,l}(x_i^{[0]} - \langle X_i^{[0]}\rangle_\theta)$$

In the same manner as the updating of the bias parameter $b_j$, the learning processing section 150 may iteratively perform updating of the learning parameters $u_{i,j,k}$ and $v_{i,j,l}$ corresponding to the input nodes ($1 \leq j \leq I$) and computing of the probability $<x_j^{[0]}>_\theta$ to determine the learning parameters $u_{i,j,k}$ and $v_{i,j,l}$ corresponding to the input nodes ($1 \leq j \leq I$). Alternatively, the learning processing section 150 may iteratively perform an operation for updating the parameter set $\theta=(b_j, u_{i,j,k}, v_{i,j,l})$ and then computing the probability $<x_j^{[0]}>_\theta$ denoted by Expression 2 to determine the parameter set $\theta=(b_j, u_{i,j,k}, v_{i,j,l})$.

As described above, the learning processing section 150 according to the present embodiment can decide upon the learning parameters $u_{i,j,k}$ and $v_{i,j,l}$ and the bias parameter $b_j$ through learning. The learning apparatus 100 may then determine whether to continue learning (S360). The learning apparatus 100 may continue learning until it performs the learning process a predetermined number of times, or may continue learning until a stop command is input by the user. Alternatively, the learning apparatus 100 may continue learning until it can no longer acquire time-series data.

If the learning apparatus 100 continues learning (S360: YES), the process may return to step S310, in which the acquiring section 110 acquires the next time-series data, and the learning apparatus 100 may then perform learning of the model 10 based on the next time-series data. For example, the supplying section 120 supplies the 0-th input layer with the next image data in the image data acquired by the acquiring section 110. Furthermore, the storage section 130 samples the values of the hidden layers and stores these values in the 0-th hidden layer. Then, values held in the t-th common layer (−T<t<0) may be supplied to the (t−1)-th common layer. The values held in the (−T+1)-th layer may be deleted. The learning apparatus 100 may perform learning by using image data supplied to the layers from the 0-th input layer to the (−T+1)-th input layer as training data and using the values stored in the layers from the 0-th hidden layer to the (−T+1)-th hidden layer.

In this way, the supplying section 120 and the storage section 130 may sequentially acquire new input values $x_j^{[0]}$ at the next time point corresponding to the nodes of the 0-th common layer in the model 10. Then, the computing section 140 may compute a conditional probability $<x_j^{[0]}>_\theta$ of the new input value $x_j^{[0]}$ on a condition that the history has occurred for each common layer before the next time point. The learning processing section 150 may adjust the weight parameter so as to increase the conditional probability of the new input value occurring on the condition that this history has occurred.

If the learning processing section 150 stops learning (S360: NO), the learning processing section 150 may output the learning parameters $u_{i,j,k}$ and $v_{i,j,l}$ and the bias parameter $b_j$ that have been determined and store the parameters in the external database 1000 or the like.

As described above, the learning apparatus 100 according to the present embodiment may be operable to apply, to time-series input data that is input in time series, a model having a total of T layers by associating one time point with the 0-th common layer and an input data sequence before the one time point with T−1 layers. The learning apparatus 100 may be operable to apply a model having hidden nodes to each common layer 12. That is, the learning apparatus 100 may be operable to form a time-evolution Boltzmann machine that predicts input data at one time point on the basis of the input data sequence and hidden node values.

The learning apparatus 100 is able to learn the model by computing a conditional probability of the input value $x_j^{[0]}$ at the one time point occurring, based on the input value $x^{(-T, -1]}$, which is a history, for a model that takes time evolution into consideration. Furthermore, since the learning apparatus 100 learns the model using hidden nodes in addition to the time-series input data, the expressive ability and learning ability can be improved.

A description has been given of the learning apparatus 100 according to the present embodiment that sequentially acquires new input data from time-series input data and adjusts the weight parameter for each input data acquired. Instead of this configuration, the learning apparatus 100 may acquire time-series input data of a predetermined duration and then adjust the weight parameters. For example, the learning processing section 150 adjusts the weight parameters collectively for a plurality of time points in response to acquisition of new input data at a plurality of time points corresponding to D layers.

Figure 4:
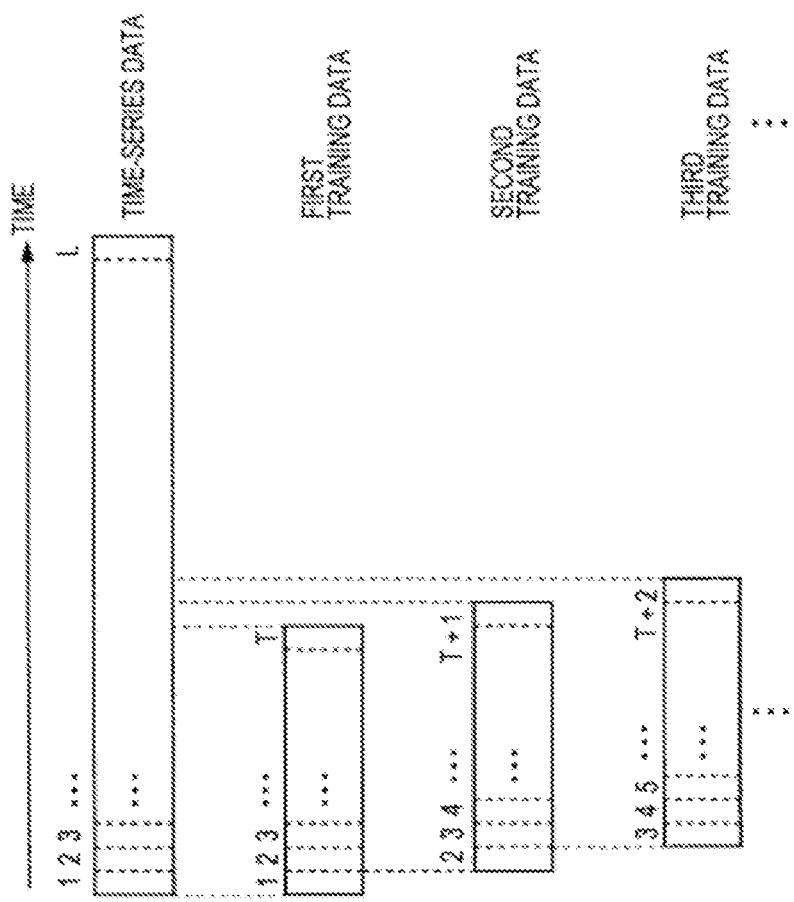
FIG. 4 shows an example of structures of time-series data and training data for use in learning in the present embodiment.

FIG. 4 shows an example of structures of time-series data and training data for use in learning in the present embodiment. In FIG. 4, the horizontal axis denotes time. FIG. 4 shows an example in which the learning apparatus 100 uses time-series data $y^{[1, L]}$ having a duration L that is longer than a duration T of time-series data $y^{[1, T]}$ used as training data by the learning apparatus 100 during learning. In this case, the learning processing section 150 may be operable to adjust weight parameters for a plurality of time points all together, in response to input data at a plurality of time points being newly acquired.

The learning apparatus 100 first performs learning using, as first training data, a time-series data segment of the time-series data from a time 1 to a time T. In this case, as described in FIG. 3, the learning apparatus 100 may perform learning by setting the time-series data and corresponding hidden layer values from the time 1 to the time T as each input value of the common layer 12 at the one time point in order, and incrementally shifting the time points one at a time toward the future. The learning apparatus 100 may use data at a time T as each input value $x_j^{[0]}$ at the one time point, and continue learning until the time-series data from the time 1 to a time T−1 becomes the input data sequence $x^{(-T, -1]}$ (i.e. the history).

Next, the learning apparatus 100 performs learning using, as second training data, a time-series data segment of the time-series data from a time 2 to a time T+1. The learning apparatus 100 may sequentially use each of D pieces of data in the second training data as the input value $x_j^{[0]}$ at the one time point. In this case, the learning apparatus 100 may shift the time point in the interval from the time 2 to the time T+1 one time point at a time toward the future and use, as the history, the corresponding time-series data and hidden nodes of the interval from the time 2 to the time T. In this way, the learning apparatus 100 may adjust the parameters D times for the D input values $x_j^{[0]}$ and the corresponding D histories. That is, the learning apparatus 100 may use a stochastic gradient technique in which the learning method described with Expressions 8 to 11 is performed.

Alternatively, the learning apparatus 100 may acquire D time-series data sets, generate a plurality of training data sets from time-sequence data segments of a duration of L, and collectively perform learning for D layers. Specifically, the learning apparatus 100 may perform the stochastic gradient technique described using Expressions 8 to 11 collectively for D layers, by using the following expression.

$$\theta \leftarrow \theta + \eta \sum_{x \in \{y^{(t,t+T-1]} | 0 \leq t < D\}} \nabla_\theta \log P_\theta(x_{[1,T]}^{[0]} | x^{(-T,-1]}) \quad \text{Expression 12}$$

Figure 5:
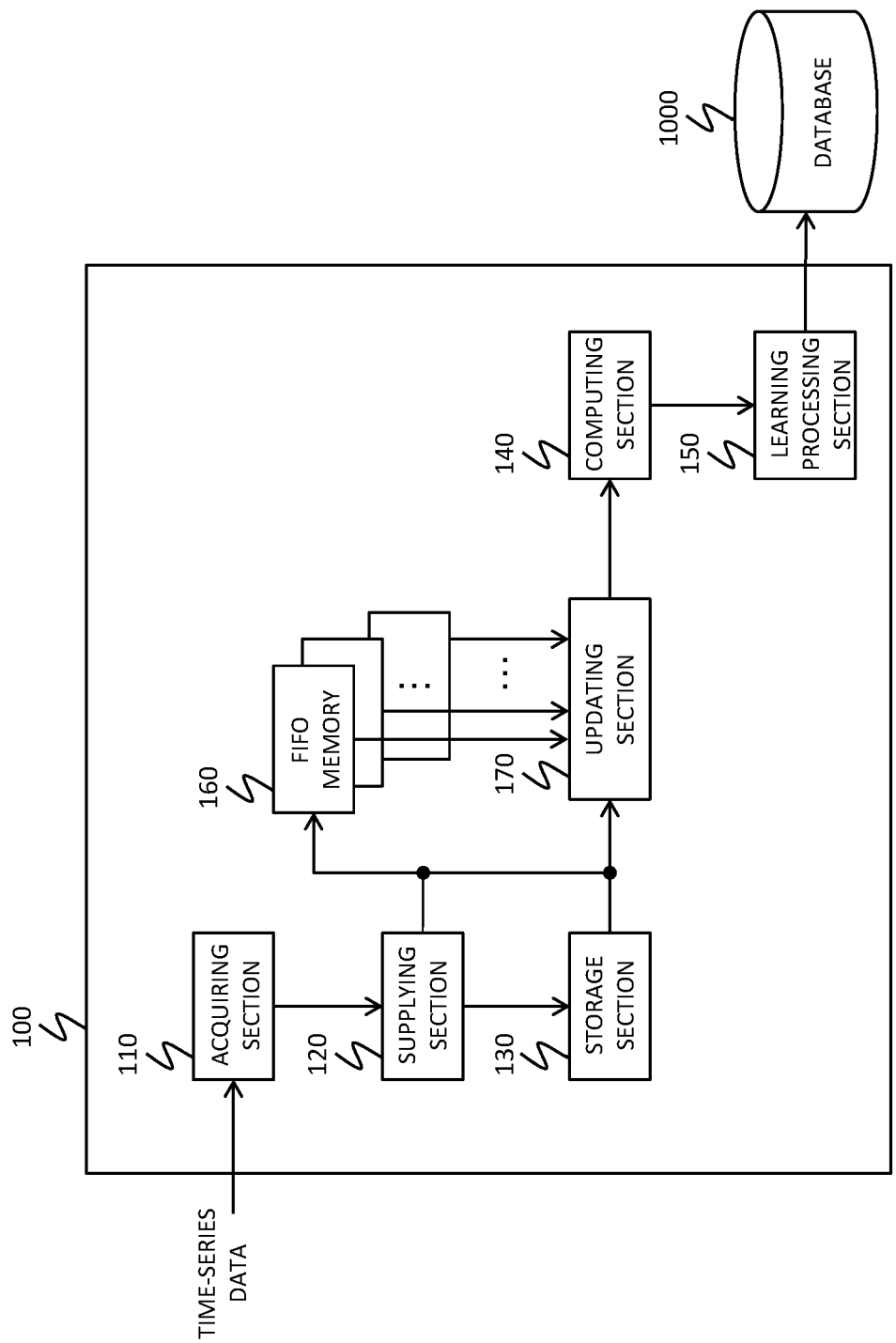
FIG. 5 shows a modification of the learning apparatus 100 according to the present embodiment.

FIG. 5 shows a modification of the learning apparatus 100 according to the present embodiment. Components of the learning apparatus 100 shown in FIG. 5 that perform substantially the same operations as those of the learning apparatus 100 according to the embodiment illustrated in FIG. 1 are denoted by the same reference numerals, and a description thereof is omitted. In a case where time-series data of a duration L such as described in FIG. 4 is provided, the learning apparatus 100 according to the present modification may be operable to efficiently update parameters by using FIFO memories and learn a model corresponding to the time-series input data. The learning apparatus 100 according to the present modification further includes FIFO memories 160 and an updating section 170.

Each of the FIFO memories 160 may sequentially store input data and output the stored data after a predetermined number of storages have been performed. Each of the FIFO memories 160 may be a memory that first outputs data that has been stored first (FIFO: First In, First Out).

Each of the FIFO memories 160 may sequentially store an input value of the common layer 12 and output the input value after a predetermined number of storages have been performed. The learning apparatus 100 may include a plurality of FIFO memories 160, the number of which is greater than or equal to the number of nodes n of the model. The plurality of FIFO memories 160 is desirably provided to have a one-to-one correspondence with the plurality of nodes of the common layer 12. That is, each of the plurality of FIFO memories 160 may be provided in a manner to store a history for a respective node of the common layer 12 or to update the history thereof.

The plurality of FIFO memories 160 are connected to the supplying section 120 and the storage section 130, and sequentially store input values corresponding to new input data of the common layer 12. The plurality of FIFO memories 160 are also connected to the updating section 170 and sequentially supply the data stored therein to the updating section 170.

The updating section 170 may be operable to update a plurality of update parameters that are based on the hidden nodes and the input data sequence of the time-series input data before the one time point, from values at a prior time point to values at the one time point, on the basis of values of the update parameters and values of the hidden nodes and input values corresponding to the input data to be reflected next. The updating section 170 may update the update parameters by using values input to the FIFO memories 160 and values output from the FIFO memories 160. The updating section 170 may be connected to the acquiring section 110 and the storage section 130, and may receive values input to the FIFO memories 160. Alternatively, the updating section 170 may receive values input to the FIFO memories 160 from the acquiring section 110 via the supplying section 120.

Here, the update parameters are $\alpha_{i, j, k}$ and $\gamma_{i,l}$ shown in Expressions 5 and 7. In this case, the update parameters are based on input values i (1≤i≤I) corresponding to input data of the input data sequence at each time point and the predefined parameters $\lambda_k^{t1}$ and $\mu_l^{t2}$ of the weight parameter $W_{ij}^{[\delta]}$ between this input value i and the target input node j ($1 \leq j \leq I$) or hidden node j ($I+1 \leq j \leq I+H$), for example. As another example, the update parameters are based on the hidden node i ($I+1 \leq i \leq I+H$) at each time point and the predefined parameters $\lambda_k^{t1}$ and $\mu_l^{t2}$ of the weight parameter $W_{ij}^{[\delta]}$ between this hidden node i and the target input node j ($1 \leq j \leq I$) or hidden node j ($I+1 \leq j \leq I+H$), for example.

The update parameters may be updated every time the acquisition of the time-series input data by the acquiring section 110 and the storage of the sampling values by the storage section 130 are performed sequentially. The above-described learning apparatus 100 according to the present modification may be operable to learn a modification of the model 10. The modification of the model 10 is described with reference to FIG. 6.

Figure 6:
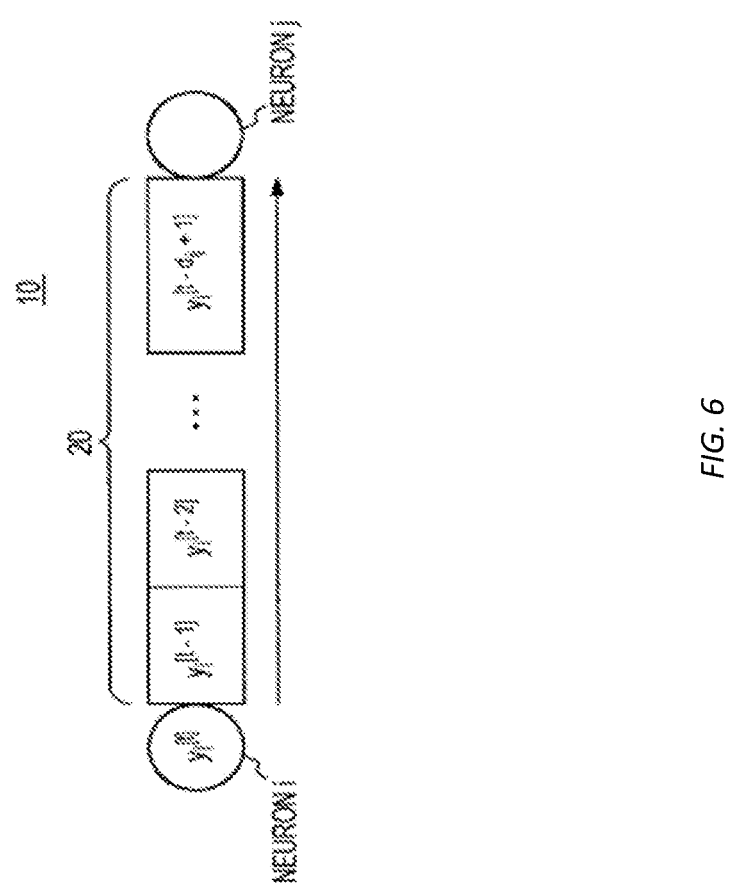
FIG. 6 shows a modification of the model 10 according to the present embodiment.

FIG. 6 shows a modification of the model 10 according to the present embodiment. The model 10 according to the modification needs not have the layered structure including T layers shown in FIG. 2. FIG. 6 shows an example of a model corresponding to one of the FIFO memories 160. Accordingly, the overall configuration of the model 10 according to the present modification includes a storage area that is equivalent to the 0-th common layer in FIG. 2 including the training data, and a number of the configurations illustrated in FIG. 6 equal to the number of nodes n (=I+H). Neurons i and j and a FIFO sequence 20 of the model 10 according to the present modification are described below.

The neuron i may be equivalent to the input terminal of the FIFO memory 160. An input value $y_i^{[t]}$ ($1 \leq i \leq I$) of each node in the input data of the input data sequence at each time point t and a corresponding value $y_i^{[t]}$ among the values $y_i^{[t]}$ ($I+1 \leq i \leq I+H$) of the hidden nodes at each time point are sequentially input to the neuron i. The neuron i may set the value $y_i^{[t]}$ input thereto as the current input value. Then, at a time point t+1, the neuron i may supply the input value $y_i^{[t]}$ input at the time point t to the updating section 170 and to the FIFO sequence 20 as the previous input value and may hold the input value $y_i^{[t+1]}$ at the time point t+1 as the current input value.

The FIFO sequence 20 may store $d_{ij}-1$ of the latest input values received from the neuron i. The FIFO sequence 20 may supply the $d_{ij}-1$ input values stored therein to the updating section 170. The updating section 170 may be operable to compute the values of the update parameters denoted by Expression 6 by using the input values supplied by the FIFO sequence. If the FIFO sequence 20 holds input values from the time point t-1 to the time point t-$d_{ij}$+1, the FIFO sequence 20 is denoted by the following expression.

$$q_{i,j} \equiv (y_i^{[t-1]}, y_i^{[t-d_{ij}+2]}, y_i^{[t-d_{ij}+1]}) \qquad \text{Expression 13}$$

After the input value $y_i^{[t]}$ is input to the neuron i at the time point t1, the FIFO sequence 20 may store the input value $y_i^{[t1]}$ up until a time point t3 (=t1+$d_{ij}$−1) which is a predetermined time period $d_{ij}$−1 after the next time point t2 (=t1+1) of the time point t1. At the next time point t4 (=t3+1=t1+$d_{ij}$), the FIFO sequence 20 may supply the input value $y_i^{[t1]}$ to the neuron j. The input value $y_i^{[t1]}$ supplied to the neuron j at the time point t4 is immediately supplied to the updating section 170 at the time point t4. However, the input value $y_i^{[t1]}$ that the neuron j has received from the FIFO sequence 20 at the time point t4 does not serve as an input for the neuron j, and the input value $y_i^{[t4]}$ may be input to the neuron j at the time point t4.

The neuron j may be equivalent to the output terminal of the FIFO memory 160, and the neuron j may receive the input value $y_i^{[t1]}$ input to the neuron i at the time point t1, via the FIFO sequence after the time period $d_{ij}$, i.e. at the time point t1+$d_{ij}$. That is, the model 10 from the neuron i to the neuron j via the FIFO sequence 20 may correspond to the FIFO memory 160 that stores $d_{ij}$ pieces of input data. In addition, the neuron i of the model 10 according to the modification may correspond to, for example, a node for an input data sequence such as a node i of the (−δ)-th common layer of the model 10 shown in FIG. 2, and in this case the neuron j may correspond to, for example, the node j of the 0-th common layer. At the time point t1+$d_{ij}$, the neuron j may supply the received input value $y_i^{[t1]}$ to the updating section 170.

As described above, the model 10 according to the present modification may supply the input values at the time point t−1 and the time point t−$d_{ij+}$1 to the updating section 170 at the time point t. In this way, the updating section 170 can update the update parameters by adding the corresponding input value in the input data to be reflected next to the update parameters for the time point before the one time point, and then multiplying the resulting sum by a predetermined constant. Note that the update parameters denoted by Expression 8 may be computed in accordance with Expression 8 by using the input values stored in the FIFO sequence 20 that are supplied to the updating section 170.

For example, the update parameter $\gamma_{i,l}$ denoted by Expression 7 can be updated by using the input values supplied to the updating section 170 and the second predefined parameter. Specifically, the updating section 170 can compute the update parameter $\gamma_{i,l}$ to be used in the current learning by performing computing at the time point t according to the following expression by using the prior update parameter $\gamma_{i,l}$ and the input value $y_i^{[t-1]}$ received from the neuron i at the time point t.

$$\gamma_{i,l} \rightarrow \mu_l(\gamma_{i,l} + y_i^{[t-1]}) \qquad \text{Expression 14}$$

Figure 7:
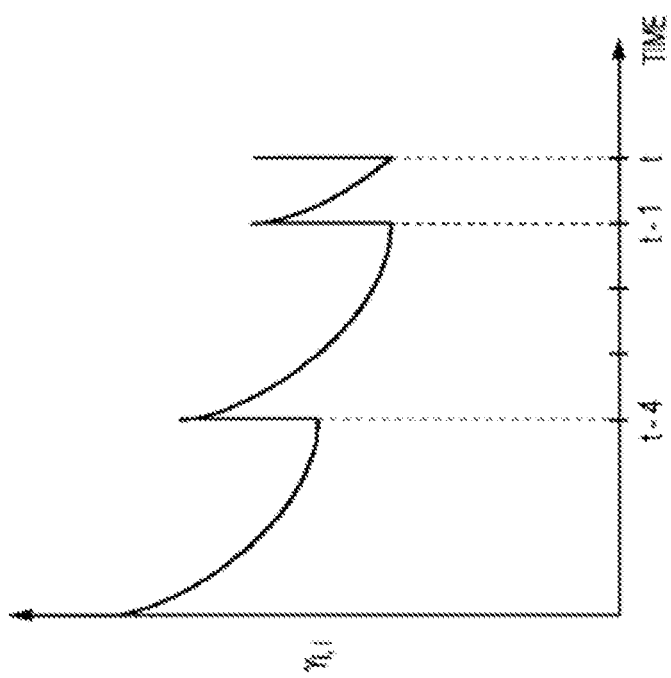
FIG. 7 shows an example of a temporal change in the update parameter $\gamma_{i,l}$ according to the present embodiment.

FIG. 7 shows an example of a temporal change in the update parameter $\gamma_{i,l}$ according to the present embodiment. FIG. 7 shows an example in which values greater than 0 (for example, 1) are input to the neuron i as the input value at time points t−5, t−2, and t−1, and these input values are supplied to the updating section 170 at time points t−4, t−1, and t. The second predefined parameter pi is a parameter whose value gradually decreases as the time point difference increases. Accordingly, the update parameter $\gamma_{i,l}$ computed by the updating section 170 tends to decrease as time passes from when the input value of 1 is input to when the next input is given.

The update parameter $\alpha_{i,j,k}$ denoted by Expression 5 can be updated by using the input values supplied to the updating section 170 and the first predefined parameter $\lambda_k$. Specifically, the updating section 170 can compute the update parameter $\alpha_{i,j,k}$ to be used in the current learning by performing computing at the time point t according to the following expression, by using the prior update parameter $\alpha_{i,j,k}$ and the input value $y_i^{[t-d_{ij}]}$ received from the neuron j at the time point t.

$$\alpha_{i,j,k} \rightarrow \lambda_k(\alpha_{i,j,k} + y_i^{[t-d_{ij}]}) \qquad \text{Expression 15}$$

Figure 8:
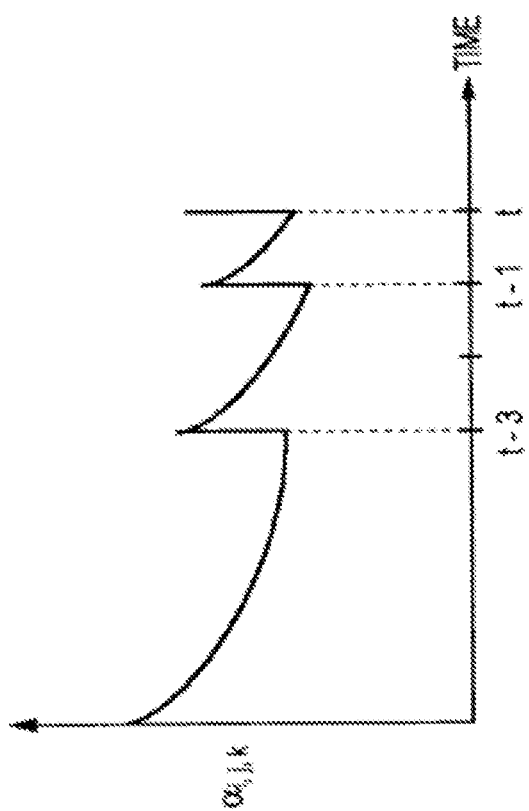
FIG. 8 shows an example of a temporal change in the update parameter $\alpha_{i,j,k}$ according to the present embodiment.

FIG. 8 shows an example of a temporal change in the update parameter $\alpha_{i,j,k}$ according to the present embodiment. FIG. 8 shows an example in which values greater than 0 (for example, 1) are supplied to the neuron j as the input value at time points t−3, t−1, and t. The first predefined parameter 4 is a parameter whose value gradually decreases as the time point difference increases. Accordingly, the update parameter $\alpha_{i,j,k}$ computed by the updating section 170 tends to decrease as time passes from when the input value of 1 is input to when the next input is given.

As described above, the learning apparatus 100 according to the present modification can update the update parameters $\alpha_{i,j,k}$ and $\gamma_{i,l}$ by applying the model 10 shown in FIG. 6 using the FIFO memories 160 and the updating section 170. Note that the updating section 170 can apply the model 10 according to the present modification, for example, by acquiring the input values $x_i^{[t-1]}$ at the time point t−1 from the input data input to the FIFO memories 160 and acquiring the input values $x_i^{[t-dij]}$ at the time point t−d from the output of the FIFO memories 160.

In addition, the learning apparatus 100 may update the parameter $\beta_{i,j,l}$ through substantially the same operation as the operation described in FIG. 3. Specifically, the computing section 140 can compute the parameter $\beta_{i,j,l}$ by determining the sum of products of the second predefined parameter pi and the input value $x_i$ ($y_i$ in the present modification) for time points from t−1 to t−$d_{ij}$+1 as indicated by Expression 6.

In this way, the computing section 140 according to the present modification can compute, by using the plurality of update parameters, conditional probabilities of input data values at one time point on the condition that the hidden node values and input data sequence have occurred. Then, the learning processing section 150 can determine the learning parameters $u_{i,j,k}$ and $v_{i,k,l}$ and the bias parameter $b_j$ by performing substantially the same operation as the operation described in FIG. 3.

In other words, the learning apparatus 100 according to the present embodiment can determine the weight parameter and bias parameters in a manner to increase the probability of predicting the input value to be input to the input layer 14 of the common layer 12, based on the past values that have been input to the common layer 12 of the model 10 before the one time point. Furthermore, the learning apparatus 100 can improve the prediction accuracy, the expressive ability, the learning efficiency, and the like of the input values input to the input layer 14 by having the common layer 12 include the hidden layer 16 in addition to the input layer 14.

The learning apparatus 100 according to the present embodiment described above is an example in which a value that is unrelated to the prediction made by the learning apparatus 100 is sampled and input as the hidden node value to be input to the hidden layer 16. Instead of this, the learning apparatus 100 may determine the hidden node value by using a history of the conditional probability of the values of the nodes of the common layer 12. The learning apparatus 100 may determine the weight parameter to a hidden node by using this conditional probability history. The learning apparatus 100 can improve the prediction accuracy by using the conditional probability history of nodes of the common layer 12 to determine the weight parameter to the hidden node and the hidden node value.

In this case, the computing section 140 may compute the conditional probability $p_{j,t}$ of the value of a node j of the common layer 12 at one time point t based on the values input to the corresponding node j of the common layer 12 at each time point before the one time point t, and store this conditional probability in the storage section or the like. In addition to the computation of the conditional probability of each input value of the input layer 14 at the one time point described above, the computing section 140 may compute the conditional probability of each hidden node in the layer 16 at the one time point in the same manner. That is, the computing section 140 may use the plurality of update parameters to compute the conditional probability of the value of each hidden node and each input data value at the one time point on the condition that an input data sequence has occurred. Here, the computing section 140 may store the conditional probability $p_{j,t}$ in a FIFO or the like.

The computing section 140 may be operable to compute a total likelihood, after the learning by the learning apparatus 100 has continued. The computing section 140 computes the total likelihood $p_j$ as shown in the following expression, based on the conditional probabilities $p_{j,t-K+1}$, $p_{j,t-K+2}$, ... $p_{j,t}$ computed by K instances of learning from the time point t−K+1 to the time point t, for example. The total likelihood $p_j$ in Expression 16 indicates a total sum of the conditional probabilities, as an example, but the total likelihood $p_j$ may be at least one of a sum, weighted sum, product, or weighted product of the conditional probabilities. Furthermore, K may be an integer greater than or equal to 2, and if the computing section 140 stores the conditional probabilities $p_{j,t}$ in a FIFO or the like, the length of the FIFO sequence may be equal to the value of K.

$$p = \sum_{s=t-k+1}^{t} p_s \qquad \text{Expression 16}$$

The computing section 140 may supply the total likelihood $p_j$ to the storage section 130. The storage section 130 may sample the values $x_j^{[t]}$ of the hidden nodes of the hidden layer 16 at the one time point, based on the most recent likelihood $p_{j,t}$. That is, the storage section 130 according to the present embodiment may be operable to sample the value of each hidden node at the one time point, by using the conditional probability of the value of each hidden node at the one time point. For example, the storage section 130 samples the values of the hidden nodes based on the history of the conditional probabilities computed by the computing section 140. That is, the storage section 130 may sample the values of the hidden nodes after the learning operation of the learning processing section 150 has been performed a plurality of times. The storage section 130 may store a value of 0 in the hidden nodes as the sampling value, until the learning operation of the learning processing section 150 has been performed a plurality of times.

The storage section 130 may store a value of 1 or 0 in the hidden node j as the sampling result, according to the result of a comparison between the value of the total likelihood $p_j$ and a threshold value. In this way, when predicting the time series data to be input to the input layer 14, the storage section 130 can store a more preferable value as the hidden node value by performing sampling based on the history of past conditional probabilities.

The learning processing section 150 may be operable to determine the weight parameter based on the total likelihood $p_j$. In this case, the learning processing section 150 may compute update amounts $\Delta u_{i,j,k}$ and $\Delta v_{i,j,k}$ for the learning parameters $u_{i,j,k}$ and $v_{i,j,k}$ in the weight parameter for one hidden node j at the one time point. For example, the learning processing section 150 may compute these update amounts $\Delta u_{i,j,k}^{[t]}$ and $\Delta v_{i,j,k}^{[t]}$ as shown in the following expression, based on the value $x_j^{[t]}$ of the one hidden node j at the one time point t and on the conditional probability $<X_j^{[t]}>$ of the value of this hidden node j at the one time point t on the condition that the input data sequence has occurred (I+1≤j≤I+H).

$$\Delta u_{i,j,k}^{[t]} = \alpha_{i,j,k}^{[t-1]} (x_j^{[t]} - <X_j^{[t]}>)$$

$$\Delta v_{i,j,l}^{(1)[t]} = \beta_{i,j,l}^{[t-1]} (<X_j^{[t]}> - x_j^{[t]})$$

$$\Delta v_{i,j,l}^{(2)[t]} = \gamma_{i,j,l}^{[t-1]} (<X_i^{[t]}> - x_i^{[t]}) \qquad \text{Expression 17}$$

Here, the update amount $\Delta v_{i,j,k}^{[t]}$ is equal to $\Delta u_{i,j,k}^{(1)[t]} + \Delta u_{i,j,k}^{(2)[t]}$. The conditional probability $<X_j^{[t]}>$ of the value of the hidden node j may be computed by the computing section 140 using Expression 2. The learning processing section 150 may store the computed update amounts $\Delta v_{i,j,k}^{[t]}$, $\Delta u_{i,j,k}^{(1)[t]}$, and $\Delta u_{i,j,k}^{(2)[t]}$ in the storage section or the like. The learning processing section 150 may be operable to store the update amounts $\Delta v_{i,j,k}^{[t]}$, $\Delta u_{i,j,k}^{(1)[t]}$, and $\Delta u_{i,j,k}^{(2)[t]}$ computed for one time point in the FIFO sequence. That is, the learning processing section 150 may be operable to update the learning parameters based on update amounts computed in the past.

The learning processing section 150 changes the ratio by which the update amounts are reflected in the learning parameters, according to the conditional probability of input data occurring at a following time point that is after the one time point t, for example. In this case, the learning processing section 150 may change the ratio by which the update amounts are reflected in the learning parameters according to the conditional probability of a hidden node value occurring at a plurality of following time points that are after the one time point. In the present embodiment, an example is described in which the learning processing section 150 changes the ratio by which the update amounts are reflected in the learning parameters according to the total likelihood $p_j$ after the one time point.

The learning processing section 150 may update the learning parameters as shown in the following expression, based on the total likelihood $p_j$ computed by K instances of learning from the time point t−K+1 to the time point t and on the update amount at the time point t−K+1, for example. Here, K may be an integer greater than or equal to 2, and if the learning processing section 150 stores the update amounts in the FIFO sequence, the length of the FIFO sequence may be equal to the value of K.

$$u_{ij} \rightarrow u_{ij} + \eta p_j \Delta u_{i,j,k}^{[t-k+1]}$$

$$v_{ij} \rightarrow v_{ij} + \eta p_j (\Delta v_{i,j,k}^{(1)[t-k+1]} + \Delta v_{i,j,k}^{(2)[t-k+1]}) \quad \text{Expression 18}$$

Here, η may be a constant for adjusting the update amount. Alternatively, η may be a coefficient whose value becomes smaller according to an increase in the number of updates. Yet further, η may have a value of substantially 1 at the stage when the learning processing section 150 begins learning, and may be a coefficient whose value becomes smaller according to the amount of learning occurring as time progresses from the time point t. For example, $\eta = \eta_0/t^2$. Furthermore, η may be a coefficient whose value becomes smaller according to the update amount. For example, $\eta = \eta_0/(\Sigma \Delta u_{i,j,k}^2)^{1/2}$.

In the manner described above, the learning processing section 150 may update the learning parameters of a hidden node at one time point according to the conditional probabilities computed at time points before the one time point. In this way, the learning apparatus 100 can more strongly reflect the update amounts at time points before the one time in the learning parameters, in response to the predicted probability of an input value of an input node being large due to the weight parameters at time points before the one time point. That is, the learning apparatus 100 can update the weight parameters of the hidden nodes in a manner to increase the conditional probabilities.

If a FIFO sequence is used to perform an update of such a weight parameter, the learning processing section 150 may extract from the FIFO sequence the update amounts $\Delta v_{i,j,k}^{[t-K+1]}$, $\Delta u_{i,j,k}^{(1)[t-K+1]}$, and $\Delta u_{i,j,k}^{(2)[t-K+1]}$ of a past time point (e.g. t−K+1) at the following time point (e.g. t) or a time point thereafter. The learning processing section 150 may update the ratio by which the update extracted from the FIFO sequence are reflected in the learning parameters according to the conditional probabilities of hidden node values occurring at the following time point t. For example, the learning processing section 150 may multiply the total likelihood $p_j$ respectively by each update amount. In this way, the learning processing section 150 can efficiently perform the update of the weight parameters as described above.

Figure 9:
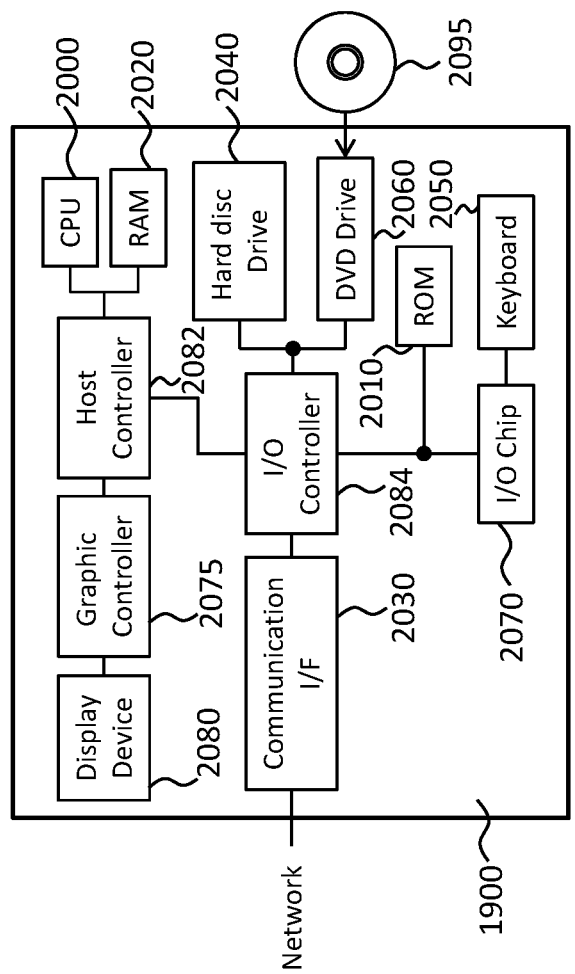
FIG. 9 shows an exemplary hardware configuration of a computer 1900 according to the embodiment of the invention.

FIG. 9 shows an exemplary configuration of a computer 1900 according to an embodiment of the invention. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 which is connected to the input/output controller 2084 and a keyboard 2050 which is connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus, such as the apparatus 100 of FIG. 1 and the apparatus 100 of FIG. 5, includes an acquiring section, a supplying section, a storage section, a computing section, a learning processing section, FIFO memories, an updating section. The program or module acts on the CPU 2000, to cause the computer 1900 to function as a section, component, and element such as the acquiring section 110, the supplying section 120, the storage section 130, the computing section 140, the learning processing section 150, FIFO memories 160, the updating section 170, described above.

The information processing described in these programs is read into the computer 1900, to function as an acquiring section, a supplying section, a storage section, a computing section, a learning processing section, FIFO memories, an updating section, which are the result of cooperation between the program or module and the above-mentioned various types of hardware resources. Moreover, the apparatus is constituted by realizing the operation or processing of information in accordance with the usage of the computer 1900.

For example when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020 such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, an embodiment of the present invention is able to increase the expressive ability and learning ability of a learning apparatus that learns a model corresponding to time-series input data.

What is claimed is:

1. A learning apparatus for learning a model corresponding to time-series input data, comprising:
 a processor; and
 one or more computer readable mediums collectively including instructions that, when executed by the processor, cause the processor to:
 supply each of respective pluralities of input nodes of the model arranged in respective layers with each of a plurality of input values corresponding to input data at one time point in the time-series input data;
 store values of hidden nodes of the model;
 compute a conditional probability of each of the plurality of input values at the one time point on a condition that an input data sequence has occurred before the one time point, based on (a) values of the input data sequence before the one time point, (b) the stored values of the hidden nodes, and (c) weight parameters determined from (i) a first plurality of hidden nodes from among the hidden nodes and a first plurality of input values both corresponding to input data at each time point before the one time point in the input data sequence and (ii) the respective pluralities of input nodes and a second plurality of hidden nodes from among the hidden nodes corresponding to the input data at the one time point; and perform a learning process based on applying a stochastic gradient technique that further increases a conditional probability of the input data occurring at the one time point on the condition that the input data sequence has occurred, by adjusting the weight parameters.

2. The learning apparatus according to claim 1, wherein the instructions further cause the processor to:

compute a conditional probability of each of hidden node values for the second plurality of hidden nodes at the one time point on the condition that the input data sequence has occurred, based on the first plurality of input and on the weight parameters.

3. The learning apparatus according to claim 2, wherein the instructions further cause the processor to:

sample each of the hidden node values for the second plurality of hidden nodes at the one time point using the conditional probability of each of the hidden node values for the second plurality of hidden nodes at the one time point.

4. The learning apparatus according to claim 3, wherein the instructions further cause the processor to:

update a plurality of update parameters, which are based on the first plurality of hidden nodes and the first plurality of input values, from update parameter values at a previous time point to update parameter values at the one time point based on each of the update parameter values at the previous time point to the one time point and on next corresponding hidden node values and next input values in next input data relative to the input data at the one time point, wherein the computing of the conditional probability of each of the plurality of input values at the one time point and the computing of the conditional probability of each of the hidden node values for the second plurality of hidden nodes at the one time point include using the plurality of update parameters to compute the conditional probabilities of each of the hidden node values of the second plurality of hidden nodes and each of the plurality of input values at the one time point on the condition that the input data sequence has occurred.

5. The learning apparatus according to claim 4, wherein the weight parameters are based on learning parameters that are learning targets and on predefined parameters that change in a predetermined manner according to a time point difference between a time point before the one time point and the one time point.

6. The learning apparatus according to claim 5, wherein the update parameters are based on:

(i) the plurality of input values corresponding to the input data at each time point in the input data sequence and (ii) the predefined parameters in various ones of the weight parameters corresponding to the input data at each time point in the input data sequence and any of the hidden nodes or respective pluralities of input nodes that are targets, and (iii) the hidden nodes at each time point and (iv) the predefined parameters in the various ones of the weight parameters corresponding to any of the hidden nodes at each time point and any of the hidden nodes or respective pluralities of input nodes that are the learning targets.

7. The learning apparatus according to claim 6, wherein performing the learning process includes:

computing update amounts of the learning parameters in corresponding ones of the weight parameters for one of the second plurality of hidden nodes at the one time point, based on a particular value of the one of the second plurality of hidden nodes at the one time point and the conditional probability of the particular value of the one of the second plurality of hidden nodes at the one time point on the condition that the input data sequence has occurred; and changing a ratio by which the update amounts are reflected in the learning parameters, according to the conditional probability of input data occurring at a following time point that is after the one time point.

8. The learning apparatus according to claim 7, wherein the changing of the ratio includes changing the ratio by which the update amounts are reflected in the learning parameters, further according to the conditional probability of a hidden node value, from among the hidden node values of the second plurality of hidden nodes, occurring at a predetermined plurality of following time points that are after the one time point.

9. The learning apparatus according to claim 8, wherein the changing of the ratio by which the update amounts are reflected in the learning parameters includes changing the ratio by which the update amounts are reflected in the learning parameters, according to at least one of a sum, a weighted sum, a product, and a weighted product of the conditional probability of the hidden node value occurring at the predetermined plurality of following time points that are after the one time point.

10. The learning apparatus according to claim 7, wherein the performing the learning process includes:

storing the update amounts at the one time point in a first in first out (FIFO) sequence; and extracting from the FIFO sequence the update amounts at the following time point or a time point after the following time point, and the changing the ratio by which the update amounts are reflected in the learning parameters includes changing the ratio by which the update amounts extracted from the FIFO sequence are reflected in the learning parameters, according to the conditional probability of the input data occurring at the following time point.

11. The learning apparatus according to claim 1, wherein the performing the learning process includes adjusting the weight parameters at a plurality of time points collectively, in response to input data of the plurality of time points being newly acquired.

12. A learning method for learning a model corresponding to time-series input data, comprising:

supplying each of respective pluralities of input nodes of the model arranged in respective layers with each of a plurality of input values corresponding to input data at one time point in the time-series input data;

storing values of hidden nodes of the model;

computing a conditional probability of each of the plurality of input values at the one time point on a condition that an input data sequence has occurred before the one time point, based on (a) values of the input data sequence before the one time point, (b) the stored values of the hidden nodes, and (c) weight parameters determined from (i) a first plurality of hidden nodes from among the hidden nodes and a first plurality of input values both corresponding to input data at each time point before the one time point in the input data sequence and (ii) the respective pluralities of input nodes and a second plurality of hidden nodes from among the hidden nodes corresponding to the input data at the one time point; and performing a learning process based on applying a stochastic gradient technique that further increases a conditional probability of the input data occurring at the one time point on the condition that the input data sequence has occurred, by adjusting the weight parameters.

13. The learning method according to claim 12, comprising:

computing a conditional probability of each of hidden node values for the second plurality of hidden nodes at the one time point on the condition that the input data sequence has occurred, based on the first plurality of input values and on the weight parameters.

14. The learning method according to claim 13, comprising:

sampling each of the hidden node values for the second plurality of hidden nodes at the one time point using the conditional probability of each of the hidden node values for the second plurality of hidden nodes at the one time point.

15. The learning method according to claim 14, comprising:

updating a plurality of update parameters, which are based on the first plurality of hidden nodes and the first plurality of input values, from update parameter values at a previous time point to update parameter values at the one time point based on each of the update parameter values at the previous time point to the one time point and on next corresponding hidden node values and next input values in next input data for a subsequent one of the plurality of images, wherein the computing of the conditional probability of each of the plurality of input values at the one time point and the computing of the conditional probability of each of the hidden node values for the second plurality of hidden nodes at the one time point include using the plurality of update parameters to compute the conditional probabilities of each of the hidden node values of the second plurality of hidden nodes and each of the plurality of input values at the one time point on the condition that the input data sequence has occurred.

16. A computer program product comprising a non-transitory computer readable storage medium having program instructions embodied therewith, the program instructions executable by a computer to cause the computer to supply each of respective pluralities of input nodes of the model arranged in respective layers with each of a plurality of input values corresponding to input data at one time point in the time-series input data;

store values of hidden nodes of the model;

compute a conditional probability of each of the plurality of input values at the one time point on a condition that an input data sequence has occurred before the one time point, based on (a) values of the input data sequence before the one time point, (b) the stored values of the hidden nodes, and (c) weight parameters determined from (i) a first plurality of hidden nodes from among the hidden nodes and a first plurality of input values both corresponding to input data at each time point before the one time point in the input data sequence and (ii) the respective pluralities of input nodes and a second plurality of hidden nodes from among the hidden nodes corresponding to the input data at the one time point; and perform a learning process based on applying a stochastic gradient technique that further increases a conditional probability of the input data occurring at the one time point on the condition that the input data sequence has occurred, by adjusting the weight parameters.

17. The computer program product according to claim 16, wherein the instructions further cause the computer to:

compute a conditional probability of each of hidden node values for the second plurality of hidden nodes at the one time point on the condition that the input data sequence has occurred, based on the first plurality of input values and on the weight parameters.

18. The computer program product according to claim 17, wherein the instructions further cause the computer to:

sample each of the hidden node values for the second plurality of hidden nodes at the one time point using the conditional probability of each of the hidden node values for the second plurality of hidden nodes at the one time point.

19. The computer program product according to claim 18, wherein the instructions further cause the computer to:

update a plurality of update parameters, which are based on the first plurality of hidden nodes and the first plurality of input values, from update parameter values at a previous time point to update parameter values at the one time point based on each of the update parameter values at the previous time point to the one time point and on next corresponding hidden node values and next input values in next input data relative to the input data at the one time point, wherein the computing of the conditional probability of each of the plurality of input values at the one time point and the computing of the conditional probability of each of the hidden node values for the second plurality of hidden nodes at the one time point include using the plurality of update parameters to compute the conditional probabilities of each of the hidden node values of the second plurality of hidden nodes and each of the plurality of input values at the one time point on the condition that the input data sequence has occurred.

* * * * *